May 12, 1970 R. C. MINNICK ET AL 3,512,141

MANUALLY PROGRAMMABLE TRANSLATOR

Filed June 13, 1960 2 Sheets-Sheet 1

INVENTORS.
ROBERT C. MINNICK
JOSEPH REESE BROWN, JR.
BY Christie, Parker & Hale
ATTORNEYS.

MANUALLY PROGRAMMABLE TRANSLATOR

Filed June 13, 1960 2 Sheets-Sheet 2

INVENTORS.
ROBERT C. MINNICK
JOSEPH REESE BROWN, JR
BY
Christie, Parker & Hale
ATTORNEYS.

United States Patent Office 3,512,141

Patented May 12, 1970

3,512,141

MANUALLY PROGRAMMABLE TRANSLATOR

Robert C. Minnick, Menlo Park, and Joseph Reese Brown, Jr., Pasadena, Calif., assignors to Burroughs Corporation, Detroit, Mich., a corporation of Delaware Filed June 13, 1960, Ser. No. 35,691

Int. Cl. G11e *11/06; 15/00; 17/00*

U.S. Cl. 340—174 19 Claims

ABSTRACT OF THE DISCLOSURE

A digital code translator utilizing magnetic cores arranged in a pair of matrix arrays. Permanent magnets are selectively movable into proximity with any of the cores to saturate selected cores and thereby change the pattern of output signals generated inductively on output windings linking the cores by a particular pattern of input signals applied to windings linking the cores.

This invention relates to digital code converting apparatus and, more particularly, is concerned with a manually settable magnetic cors translating device.

A number of different codes have been devised for representing digital information in terms of binary bits. For example, information may be represented in the straight binary code, 8–4–2–1 weighted binary-coded decimal, a biquinary code, a 2-out-of-5 code, a Hollerith code, and many others. It is frequently necessary, in interconnecting different pieces of digital equipment, to provide means for converting from one standard code to another. For example, a converter is required to translate information from a punched card which is in a Hollerith code to the input of a digital computer which operates in a straight binary code. Many other similar code conversion requirements are well known.

The present invention is directed to apparatus which may be manually programmed to provide conversion from one code on the input to another code on the output as long as there is a one-to-one correlation between the two codes. The code conversion operation is established on a punched sheet which is inserted in the equipment. The pattern of holes in the sheet establishes the relation between the input and output to effect the desired code translation.

In brief, the invention includes an input array of ferrite cores and an output array of ferrite cores. Associated with each core of both arrays is a permanent magnet which is movable into and out of proximity with the associated core. A template is insertable between the means for supporting the permanent magnets and the array of cores, the template being provided with a pattern of holes through which only selected magnets can be moved into close proximity to their associated cores. Suitable input windings are provided on the cores of the input array by means of which N binary bits are compared with the arrangement of the permanent magnets so as to energize a selected one of K output windings from the input array.

The output windings of the input array are coupled to the input windings of the output array. The output array is arranged such that an input signal on any one of the input circuits generates a pattern of binary bits on the output circuits, determined by the arrangement of the permanent magnets in association with the cores of the output array. Thus the combination of the input core array and the output core array with the associated permanent magnets is capable of receiving an input word of N bits and converting it to an output word of M bits, the pattern of output bits being determined by the arrangement of the permanent magnets and the pattern of the input bits.

For a more complete understanding of the invention, reference should be had to the accompanying drawings, wherein.

Figures 1, 3, 5:
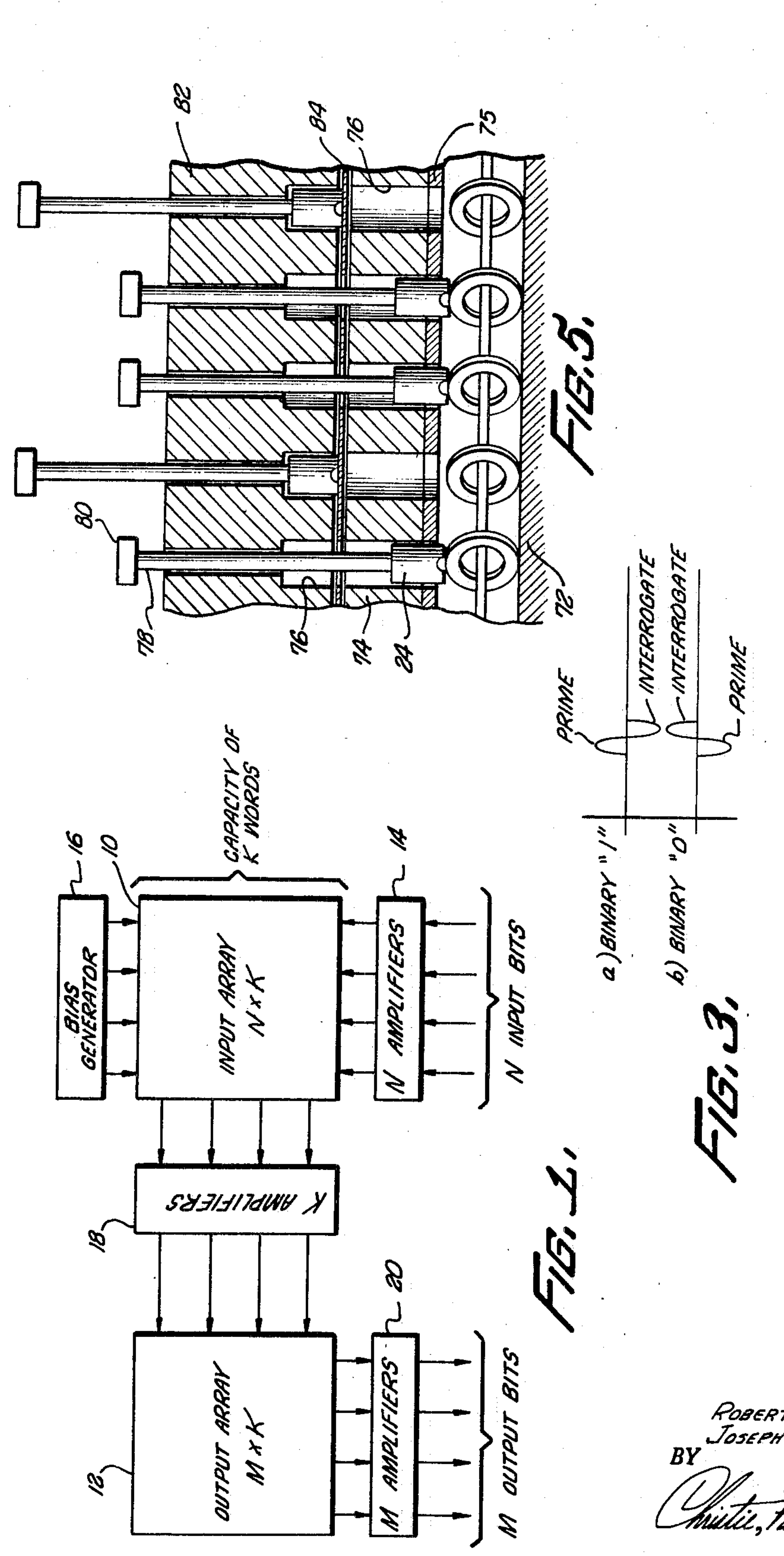
FIG. 1 is a functional block diagram of the code converter of the present invention.
FIG. 3 is a series of wave forms depicting the signals generated in the operation of the circuit of FIG. 2.
Figure 4:
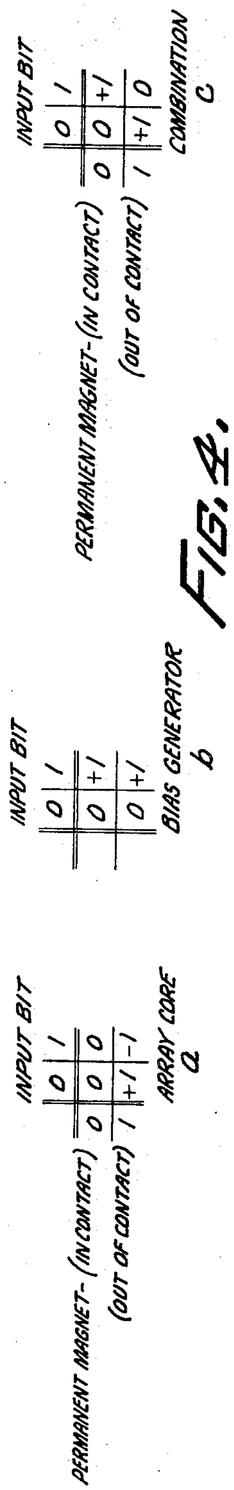
Figure 2:
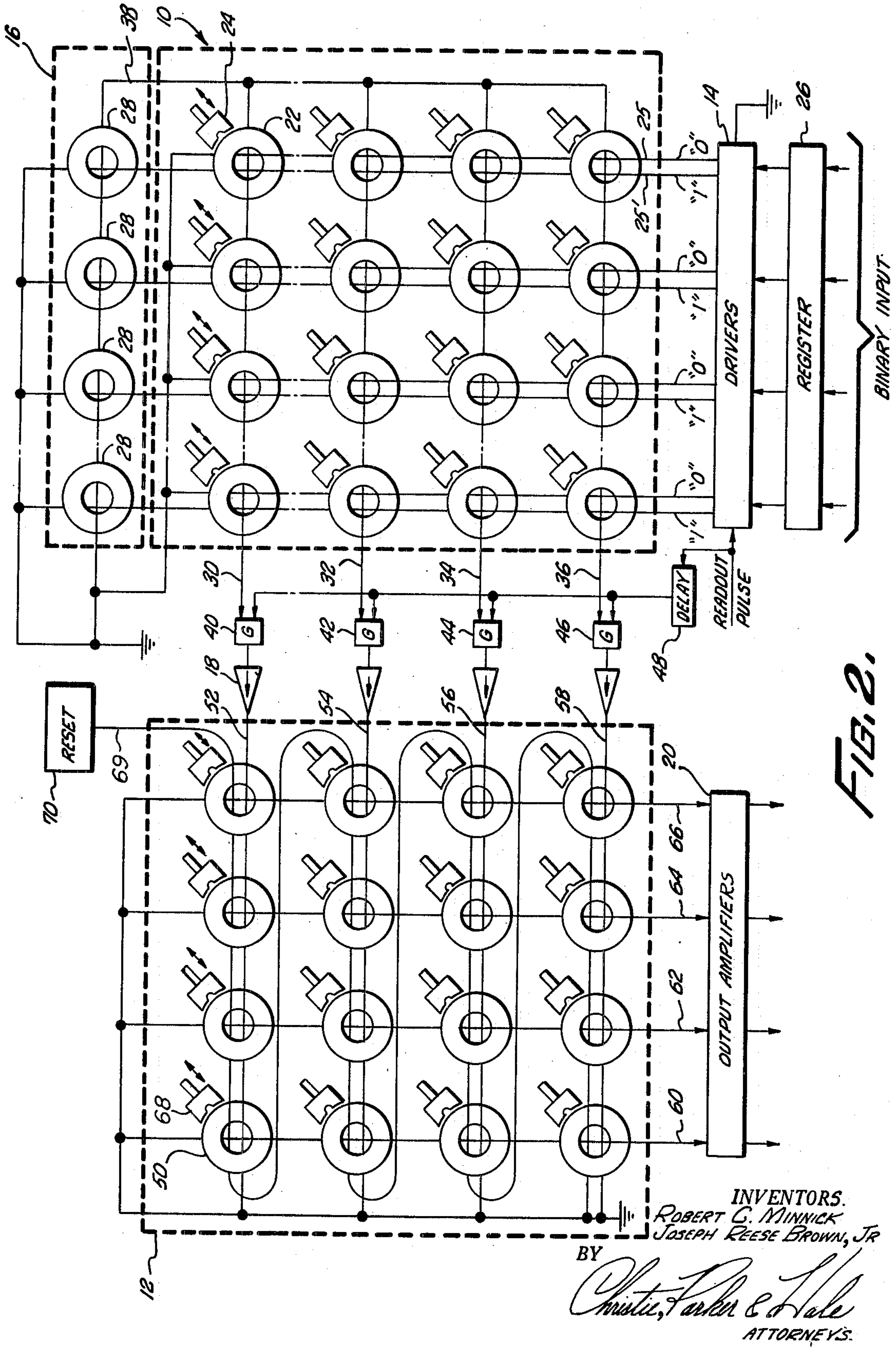
FIG. 2 is a schematic wiring diagram of the input and output core arrays.

FIGS. 4A–C are tables used in explaining the operation of the circuit of FIG. 2; and FIG. 5 is a sectional view showing the physical arrangement of the cores and the associated permanent magnets.

As shown in FIG. 1, the code converter of the present invention includes an input array, indicated at 10, and an output array indicated at 12. The input array includes a plurality of magnetic core elements made of ferrite or other material having a substantially rectangular hysteresis loop characteristic, and the input array includes $N \times K$ number of cores, where N is the number of input bits and K is the number of output circuits. The input array is driven by N input drivers, indicated generally at 14, in response to a group of N binary input bits. A bias generator 16 is also associated with the input array.

As will hereinafter be more fully described, a permanent magnet is associated with each of the cores in the input array, the permanent magnets being movable into and out of association with the associated cores. Thus the permanent magnets provide a second binary input to the input array 10 in the sense that a permanent magnet moved adjacent to a core corresponds to a binary 0, and the permanent magnet moved out of the vicinity of the core corresponds to a binary 1. A group of cores associated with an output line stores one word in the form of a pattern of associated permanent magnets. Thus the permanent magnets provide a capacity of K input words to the input array.

The output lines from the input array 10 are amplified by a group of amplifiers, indicated at 18, there being one amplifier for each output line.

The amplified output signals from the input array are applied to the output array 12, which includes an $M \times K$ number of cores in the array, where M is the number of binary output bits. M output lines from the output array 12 are applied to a group of output amplifiers 20, there being M number of amplifiers, one for each output line from the output array 12. Each of the cores of the output array also has associated therewith a permanent magnet which is movable into or out of proximity with an associated core in the array.

Referring to FIG. 2, the input array 10 comprises a plurality of annular magnetic cores such as indicated at 22. The cores are arranged in a matrix of horizontal rows and vertical columns. Each core has associated therewith a permanent magnet 24 which is arranged to be movable into and out of contact with the core. The permanent magnet is preferably in the form of a horseshoe magnet with both poles arranged to be brought into contact with the periphery of the core. The effect of bringing the permanent magnet into contact with the surface of the core is to block the core so that flux cannot be switched in the core in response to a current passing through the central aperture. Thus the permanent magnets 24 produce a blocked or unblocked condition in the associated cores, depending upon whether the permanent magnets are in contact with or removed from the respective associated cores. The manner in which the permanent magnets are moved into and out of contact with their associated cores is described below in connection with FIG. 5.

Each column of cores in the input array has two wires 25 and 25' threading the cores. These two wires represent one input circuit, there being N number of input circuits. One of these wires, namely wire 25, is associated with a binary 0 input bit and the wire 25' is associated with a binbry 1 input bit. One or the other of each pair of wires in the respective columns is pulsed from one of the input drivers 14. Which wire in a pair that is pulsed is determined by the binary information stored in an associated register 26.

The drivers 14 are arranged to pulse one or the other of the two input wires 25 and 25' of each column in the array according to the associated digital information stored in the register 26. When a readout pulse is applied to the drivers 14, the drivers are arranged to provide a prime pulse followed by an interrogate pulse on one or the other of each pair of input wires, the prime pulse and interrogate pulse being of opposite polarity. Further, the polarities of the prime pulse and the interrogate pulse as applied to the wire 25 and the wire 25' are opposite. The wave form of the current pulses produced by the drivers 14 is shown in FIGS. 3*a* and 3*b*. A suitable driver circuit is described in more detail in the copending application Ser. No. 13,194, filed Mar. 7, 1960 and now U.S. Pat. No. 3,141,155 and assigned to the assignee of the present invention.

Each of the wires 25' from the drivers 14, after passing through the cores in the respective columns of the array 10, pass through one of the cores indicated at 28 in the bias generator 16. There is one core 28 in the bias generator 16 for each column of the input array 10.

An output circuit is associated with each row of cores in the array 10. Thus output leads 30, 32, 34 and 36 respectively link the cores in each of the horizontal rows of the array. The output leads 30–36 are connected to ground through a common lead 38 which passes through the four cores 28 of the bias generator 16.

The output leads 30–36 are connected respectively to gating circuits 40, 42, 44 and 46 to which also are applied a strobing pulse derived from the readout pulse input to the driver circuit 14 through a delay circuit 48. By virtue of the delay circuit 48, the gates 40–60 are strobed simultaneously with the generating of the interrogate pulse proportion of the input pulses derived from the driver circuits 14. Gates 40–46 are arranged to pass the strobing pulse to the output of the gates only in response to a zero potential on the output leads 30–36 of the input array 10. A positive potential on the output leads inhibits passage of the strobing pulses by the gates 40–46.

The operation of the input array 10 and associated circuitry as above described is as follows. As mentioned above, when one of the permanent magnets 24 is moved into contact with its associated core 22, the core is blocked so that flux cannot be switched in the core. Thus no output signal can be generated in the associated output lead in response to a pulse from the driver circuit 14 on the input leads. However, if a permanent magnet 24 is withdrawn from the core, a voltage is induced in the associated output lead in response to pulsing of one of the associated input leads by the driver circuit 14. In this situation, the prime pulse insures that the flux is aligned in one direction in each of the cores of the array, and the interrogate pulse then reverses the direction of flux. The direction in which the flux is reversed is opposite for a binary 0 input bit and for a binary 1 input bit. Thus the polarity of the voltage induced in the associated output lead during the interrogate pulse time is of opposite polarity for a binary 0 input and for a binary 1 input.

The chart in FIG. 4A shows the resulting unit of voltage and its polarity generated at an output lead by a core in the input array for the various combinations of input bits and positions of the permanent magnet in relation to the core. Thus, with a 0 input bit, corresponding to a positive interrogation pulse, and the permanent magnet in contact with the core, zero output voltage is induced in the output lead because the core is blocked by the permanent magnet. Likewise, a zero output voltage is provided with a binary 1 input bit since the core is also blocked. However, if the permanent magnet is out of contact, a positive unit of voltage is induced in the associated output lead in response to a binary input bit 0, while a negative unit of voltage is induced in response to a binary input of 1.

FIG. 4B shows the voltage induced by the bias core 28 in the bias generator 16 in response to a binary input bit 0 and a binary input bit 1. Since only the binary 1 input bit lead links the bias generator, a positive unit of voltage is generated in the output lead by the bias generator in response to a binary 1 input. The combination of the bias core and core in the input array on the voltage induced in the output lead is shown in FIG. 4C. It will be seen from FIG. 4C, which is the sum of the two conditions shown in FIGS. 4A and 4B, that when the permanent magnet is in contact with the core in the array, corresponding to a 0 binary bit and the input bit from the register 26 is a 0, a zero voltage will be induced in the output lead. Likewise, when the permanent magnet is out of contact with the core, corresponding to a binary 1 bit, and the input bit from the register 26 is a 1, zero output voltage is again induced in the output lead. Otherwise, a unit of plus voltage is induced in the output lead. In other words, a match between the binary input as represented by the position of the permanent magnet and the binary input information derived from the register 26 produces a zero output voltage on the output lead as applied to the associated gates 40–46. If a match exists between each of the binary inputs of the register 26 with the corresponding binary word input provided by the positioning of the associated magnets in any one row, an output signal is derived from that row in the input array. Thus the input array and the associated circuitry are primarily a word comparison circuit which compares the binary coded input word with the word stored magnetically in each row of the core array.

The output array 12 also includes a matrix of ferrite cores 50 arranged in horizontal rows and vertical columns. Each of the cores in a row is linked by a single conductive lead, such as the leads 52, 54, 56 and 58 which are all connected to a common return. These leads are respectively pulsed by the output signals derived respectively from the gates 40–46 after amplification by the amplifiers 18. Each of the vertical columns in turn is linked by a single output lead, such as indicated respectively at 60, 62, 64 and 66, which are connected to the output amplifiers 20 and to the common return.

Each of the cores 50 in the output array has an associated permanent magnet 68 which is movable into and out of contact with the core in the same manner as the permanent magnets 24 of the input array. All of the cores 50 of the output array are linked by a reset wire 69 and are pulsed by a current pulse derived from a reset pulse source 70.

In operation, only the cores in a particular row which are not blocked by the permanent magnets produce signals on the output leads in response to an output signal from the input array. Thus the binary pattern of signals on the output leads in response to the pulsing of a particular one of the input leads is determined by the setting of the permanent magnet associated with the cores linked by that particular input lead.

The physical arrangement of the core arrays is shown in FIG. 5. The annular magnetic cores are cemented or otherwise supported from an insulating base member 72. Positioned above the cores is a block 74 having a plurality of holes such as indicated at 76. A magnetic shielding plate 75 is provided on the outer surface of the block 74, the shield having openings aligned with the holes 76. Permanent magnets 24 are movable into contact with the respective cores in the openings 76 of the block 74. Each of the permanent magnets 24 is secured to the lower end of plastic rods 78 which have knobs 80 secured to the upper ends thereof. The rods 78 pass through openings in an upper block 82. A template 84, in the form of a thin paper card having a pattern of holes punched in it, is positioned between the upper block 82 and the lower block 74.

The block 82 may be removed to lift all the permanent magnets out of contact with the cores and to remove them from the openings 76 in the lower block 74. The template is then put in position, and the upper block lowered in position. Where openings in the template are provided, the permanent magnets drop through the holes and down into contact with the associated cores. In this manner, the information provided by the positioning of the cores can be quickly changed merely by changing the template. A number of standard templates can be readily provided, by means of which the converter can be easily changed to provide any desired type of code conversion.

From the above description, it will be recognized that a core circuit arrangement is provided by means of which any arbitrary binary input code can be converted to any other binary code at the output. The device has the flexibility that the type of code conversion effected may be readily changed simply by changing the template. A broader application of the core circuit described would be for computer control applications where the input code may be a command with the output bits each controlling some basic operation of the computer. These basic operations could be modified by changing the template, thus increasing the flexibility of the computer control. It will be further recognized that the input array has utility apart from operation of the output array. The input array provides a means for selecting any one of a group of output circuits in response to a comparison between a binary coded word applied to the input and a binary coded word stored in the form of a group of permanent magnets in contact with selected ones of the cores in any given row. Thus the input array can be used to address a memory storage device in which the address could be readily modified simply by changing templates. Thus the input array could be used as part of a tag memory system such as described in copending application Ser. No. 780,056, filed Dec. 12, 1958, and now U.S. Pat. No. 3,438,017, and assigned to the same assignee as the present invention.

What is claimed is:

1. Apparatus comprising a first array of magnetic cores arranged in columns and rows, the cores having at least one aperture and a substantially rectangular hysteresis characteristic, a permanent magnet associated with each core in the first array and movable into and out of contact with the associated core for selectively blocking or unblocking each core, an output winding passing through an aperture in each of the cores in a row for generating an output signal in response to flux changes in any of the cores, means responsive to binary coded input signals including a group of windings respectively passing through an aperture in each of the cores in each of the columns of the first array for switching flux about the apertures in the unblocked cores of each column selectively in one direction or the other, whereby each unblocked core induces a voltage in the associated output winding of one polarity or the other, means coupled to each of the output windings and responsive to the binary coded input signals for generating a pulse having an amplitude proportional to the number of binary bits of one value represented by the binary coded input signals, said pulse generating means being actuated simultaneously with the switching of flux in the unblocked cores, a second array of magnetic cores arranged in columns and rows, the cores having at least one aperture and a substantially rectangular hysteresis characteristic, a permanent magnet associated with each core in the second array and movable into and out of contact with the associated core for selectively blocking or unblocking each core, an output winding passing through an aperture in each of the cores in a column of the second array, an input winding passing through an aperture in each of the cores in a row of the second array, means for resetting the flux in one of the directions around the aperture in each of the unblocked cores of the second array, and means for coupling each of the output windings of the first array to a corresponding one of the input windings of the second array including means for pulsing any of the input windings in response to a pulse of predetermined magnitude on the associated output windings of the first array.

2. Apparatus comprising a first array of magnetic cores arranged in columns and rows, the cores having at least one aperture and a substantially rectangular hysteresis characteristic, a permanent magnet associated with each core in the first array and movable into and out of contact with the associated core for selectively blocking or unblocking each core, an output winding passing through an aperture in each of the cores in a row for generating an output signal in response to flux changes in any of the cores, means responsive to binary coded input signals including a group of windings respectively passing through an aperture in each of the cores in each of the columns of the first array for switching flux about the apertures in the unblocked cores of each column selectively in one direction or the other, whereby each unblocked core induces a voltage in the associated output winding of one polarity or the other, means coupled to each of the output windings and responsive to the binary coded input signals for generating a signal characteristic of the number of binary signals characteristic of one preselected value, a second array of magnetic cores arranged in columns and rows, the cores having at least one aperture and a substantially rectangular hysteresis characteristic, a permanent magnet associated with each core in the second array and movable into and out of contact with the associated core for selectively blocking or unblocking each core, an output winding passing through an aperture in each of the cores in a column of the second array, an input winding passing through an aperture in each of the cores in a row of the second array, means for resetting the flux in one of the directions around the aperture in each of the unblocked cores of the second array, and means for coupling each of the output windings of the first array to a corresponding one of the input windings of the second array including means for pulsing any of the input windings in response to a pulse of predetermined magnitude on the associated output windings of the first array.

3. Apparatus comprising an array of magnetic cores arranged in columns and rows, the cores having at least one aperture and a substantially rectangular hysteresis characteristic, a permanent magnet associated with each core in the array and movable into and out of contact with the associated core for selectively blocking or unblocking each core, an output winding coupled to each of the cores in a row for generating an output signal in response to flux changes in any of the cores, means including a group of input windings respectively passing through an aperture in each of the cores in each of the columns of the array for switching flux about the apertures in the unblocked cores of each column selectively in one direction or the other in response to binary coded input signals applied to the input windings, whereby each unblocked core induces a voltage in the associated output winding of one polarity or the other, and means coupled to each of the output windings and responsive to the binary coded input signals applied to the input windings having a preselected one of the binary values for inducing in each output winding a signal having a magnitude proportional to the number of binary coded input signals of the predetermined one of the binary values applied to the input windings and a polarity opposite to the polarity of the voltage induced in an output winding by a switching of flux in an unblocked core in response to a binary input signal of the preselected binary value.

4. A code converter including an input group and an output group of annular cores of magnetic material having a rectangular hysteresis characteristic, the cores in each group being arranged in columns and rows, a plurality of permanent magnets, one permanent magnet being associated with each core of the input and output groups, the magnets being individually movable into and out of contact with the cores for blocking or unblocking the cores, a plurality of output windings equal to the number of rows in the input group, each output winding passing through an aperture in each of the cores of an associated row in the input group of cores, a plurality of input windings equal to the number of rows in the output group, each input winding passing through an aperture in each of the cores of an associated row in the output group of cores, means for coupling each output winding of the input group of cores to a corresponding one of the input windings of the output group of cores, means responsive to a group of binary input bits for switching flux in all the unblocked cores in each column of the group of input cores in one direction or the other depending on the respective values of the input bits, means responsive to the binary input bits for pulsing each of said output windings with a pulse of magnitude proportional to the number of binary bits of one value simultaneously with the switching of flux in the cores by said flux switching means, means for resetting the flux in all the unblocked cores of the output group in one direction, and a plurality of output windings passing through an aperture in each of the cores of the output group, each of said last-named output windings passing through an aperture in each of the cores of an associated column of cores in the output group.

5. Apparatus comprising a plurality of core elements, each of the core elements being made of a magnetic material having a rectangular hysteresis characteristic and having at least one aperture, the core elements being arranged in an array of columns and rows, a plurality of output circuits, each output circuit including a current conductor passing through the aperture of each of the cores in a particular row of the array, there being one output circuit for each row of the array, a plurality of input circuits, each input circuit including at least one current conductor passing through the apertures of each of the cores in a particular column, there being an input circuit for each column of the array, means responsive to binary coded signals coupled to the input circuits for switching flux in all the cores of each column of the array selectively in one direction or the other depending on the associated binary signal, means responsive to the binary coded signals for applying to each of the output circuits a signal characteristic of the number of the binary coded signals of one of the two binary values, and means including a plurality of permanent magnets individually movable into and out of the vicinity of the respective cores for selectively blocking particular cores in the array, there being one permanent magnet associated with each core in the array.

6. Apparatus as defined in claim 5 further comprising a template holder disposed between the permanent magnets and the cores, and a template having a pattern of openings inserted in the template holder, the holes being aligned with selected magnets for permitting the magnets to be moved through the holes into contact with the associated cores, whereby a selected pattern of cores may be blocked.

7. Apparatus comprising a group of annular cores having a rectangular hysteresis characteristic, first input means including a plurality of permanent magnets, the permanent magnets being movable into and out of contact with the cores, whereby the cores may be selectively blocked or unblocked, second input means responsive to binary coded input signals including separate windings on each of the cores for selectively switching flux in the unblocked cores in one direction or the other, output means including an output winding passing through each of the annular cores of the group, and means responsive to the second input means for pulsing the output winding simultaneously with the switching of flux in the cores.

8. Apparatus as defined in claim 7 including additional groups of cores in each of the additional groups of cores having one of the separate windings of the second input means passing through an aperture therein, permanent magnets movable into and out of contact with the cores of said additional groups, additional output windings, each additional output winding passing through each of the cores of a respective one of the additional groups of cores, said pulsing means simultaneously pulsing each of said additional output windings.

9. Apparatus as defined in claim 7 wherein said pulsing means includes means for generating a pulse whose magnitude is proportional to the number of cores in a group in which the flux tends to be switched in one direction by said second input means.

10. Apparatus as defined in claim 7 wherein said pulsing means includes an additional group of the same number of cores, each core of the additional group of cores having one of the separate windings of the second input means passing through an aperture therein, and a winding passing through each core of the additional group of cores connected in series with the output winding passing through said first-named group of cores.

11. A comparing circuit comprising a magnetic core, first binary input means including a permanent magnet movable into and out of association with the core to selectively block or unblock the core, the blocked condition corresponding to a binary zero and the unblocked condition corresponding to a binary one condition, second binary input means responsive to a binary coded input signal for switching the direction of flux in the core when it is unblocked, said second input means including means for switching the flux from one direction to the other in response to a binary zero input signal and for switching the flux in the opposite direction in response to a binary one input, an output winding on the core, and pulsing means for applying a pulse to the output winding in response to a binary input to the second binary input means of one binary value only, the pulse having an opposite polarity relative to a pulse generated in the output winding by the switching of flux in the core in response to a binary input of the same binary value, whereby a discrete output signal is generated by the output winding in response to a match between the two binary inputs.

12. Apparatus as defined in claim 11 wherein said pulsing means includes an additional magnetic core responsive to a binary input to the second input means of oen binary value only for switching the flux in the additional core and an output winding on the additional core in series with the output winding of said first-mentioned core.

13. Apparatus as defined in claim 11 further including additional identical comparing circuits in which the respective output windings are connected in series to form a group of said circuits, whereby a plurality of binary inputs can be compared simultaneously.

14. Apparatus as defined in claim 13 further including additional groups of said comparing circuits to form an array, each group having an output winding passing through each of the cores in the group, the corresponding cores in the respective groups being actuated simultaneously by the associated second input means in response to a binary input signal.

15. A comparing circuit comprising a magnetic core, first binary input means including a permanent magnet movable into and out of association with the core to selectively block or unblock the core, the blocked condition corresponding to a binary zero and the unblocked conditions corresponding to a binary one condition, second binary input means responsive to a binary coded input signal for switching the direction of flux in the core when it is unblocked, said second input means including means for switching the flux from one direction to the other in response to a binary zero input signal and for switching the flux in the opposite direction in response to a binary one input, an output winding on the core, and means for pulsing the output winding in response to a binary input to the second binary input means of one binary value only.

16. A comparing circuit comprising a magnetic core, first binary input means including means for blocking and unblocking the magnetic core to define a binary zero and a binary one condition for the magnetic core, second binary input means responsive to a binary coded input signal for switching the direction of flux in the core when it is unblocked, the second input means including means for switching the flux from one direction to the other in response to a binary zero input signal and for switching the flux in an opposite direction in response to a binary one input, an output winding on the core, and means for applying a pulse to the output winding in response to a binary input to the second binary input means of one binary value only, the pulse having an opposite polarity relative to a pulse generated in the output winding by a switching of flux in the core in response to a binary input of the same binary value, whereby a discrete output signal is generated by the output winding in response to a match between the first and second binary input means.

17. A comparing circuit comprising a first magnetic core having a substantially rectangular hysteresis characteristic, first binary input means including means for blocking and unblocking the first magnetic core to define a binary zero and a binary one condition for the first magnetic core, second binary input means responsive to a binary coded input signal for switching the direction of flux in the first magnetic core when it is unblocked, the second binary input means including means for switching the flux from one direction to the other in response to a binary zero input signal and for switching the flux in an opposite direction in response to a binary one input, an output winding on the first magnetic core, a second magnetic core having a substantially rectangular hysteresis characteristic, an output winding on the second magnetic core in series with the output winding on the first magnetic core, and means for switching flux in the second magnetic core in response to a binary input to the second binary input means of one binary value only to produce a pulse signal in the output winding of the second magnetic core having an opposite polarity relative to a pulse generated in the output winding of the first magnetic core by a switching of flux in the first magnetic core in response to a binary input of the same binary value, whereby a discrete output signal is generated on the output windings in response to a match between the first and second binary input means.

18. A comparing circuit comprising a first group of magnetic cores having a substantially rectangular hysteresis characteristic, first binary input means for selectively blocking or unblocking each magnetic core in the first group to define a binary zero or a binary one condition for each magnetic core, second binary input means responsive to a binary coded input signal for selectively switching the direction of flux in unblocked magnetic cores in the first group of magnetic cores, the second input means including separate windings on each of the magnetic cores of the first group for switching the flux from one direction to the other in response to binary zero input signal and for switching the flux in an opposite direction in response to a binary one input, output means including an output winding passing through each of the cores of the first group of magnetic cores, a second group of magnetic cores having a substantially rectangular hysteresis characteristic, each core of the second group being associated with a different core of the first group of magnetic cores, an output winding passing through each core of the second group in series with the output winding passing through each core of the first group, and means including a predetermined one of the separate windings on each core of the first group for switching flux in the associated cores of the second group in response to a binary input to the second binary input means of one binary value only to produce an output pulse in the output winding of the second group, the output pulse having an opposite polarity relative to a pulse generated in the output winding of the first group by switching of flux in a core of the first group in response to a binary input of the same binary value, whereby discrete output signal generated on the output windings in response to a match between the first and second binary input means.

19. A comparing circuit comprising an array of magnetic cores arranged in rows and columns, the cores having a substantially rectangular hysteresis characteristic, first binary input means for selectively blocking and unblocking the magnetic cores to define a binary zero and a binary one condition for each magnetic core, an output winding passing through each of the cores in a row for generating an output signal in response to flux changes in any of the cores, second binary input means including a group of input windings respectively passing through each of the cores in each of the columns of the array for switching flux in unblocked cores of each column selectively in one direction or the other in response to binary coded input signals applied to the input windings whereby each unblocked core induces a voltage in the associated output winding of one polarity or the other, and bias generator means including a plurality of magnetic cores having a substantially rectangular hysteresis characteristic, one core being associated with each column of cores, an output winding passing through each core of the plurality of cores connected in series with the output windings passing through each row of cores, means including a predetermined one of each of the input windings of each column passing through the core of the bias generator associated with the column for switching flux in the core of the bias generator in response to a binary input signal of one binary value only to produce an output pulse in each output winding having a magnitude proportional to the number of binary coded input signals of the predetermined one of the binary values applied to the input windings and a polarity opposite to the polarity of the voltage induced in an output winding by a switching of flux in an unblocked core of the array in response to a binary input signal of the preselected binary value.

References Cited

UNITED STATES PATENTS

| | | | |
|---|---|---|---|
| 2,814,031 | 11/1957 | Davis | 340—174 |
| 2,740,110 | 3/1956 | Trimble | 340—174 |
| 2,769,873 | 11/1956 | Noregaard | 340—174.1 |

JAMES W. MOFFITT, Primary Examiner

U.S. Cl. X.R.

340—146.2

PO-1050
(5/69)

UNITED STATES PATENT OFFICE
CERTIFICATE OF CORRECTION

Patent No. 3,512,141 Dated May 12, 1970

Inventor(s) Robert C. Minnick and Joseph Reese Brown

It is certified that error appears in the above-identified patent and that said Letters Patent are hereby corrected as shown below:

Column 1, Line 23- "core" has been substituted for "cors";
Column 3, Line 5 - "binary" has been substituted for "binbry";
Line 25- "Pat. No. 3,141,158" has been substituted for "Pat. No. 3,141,155";
Line 41- "-46" has been substituted for "-60".

CLAIM 12.
Column 8, Line 55- "one" has been substituted for "oen".

SIGNED AND SEALED
OCT 20 1970

(SEAL)
Attest:

Edward M. Fletcher, Jr.
Attesting Officer

WILLIAM E. SCHUYLER, JR.
Commissioner of Patents